UNITED STATES PATENT OFFICE.

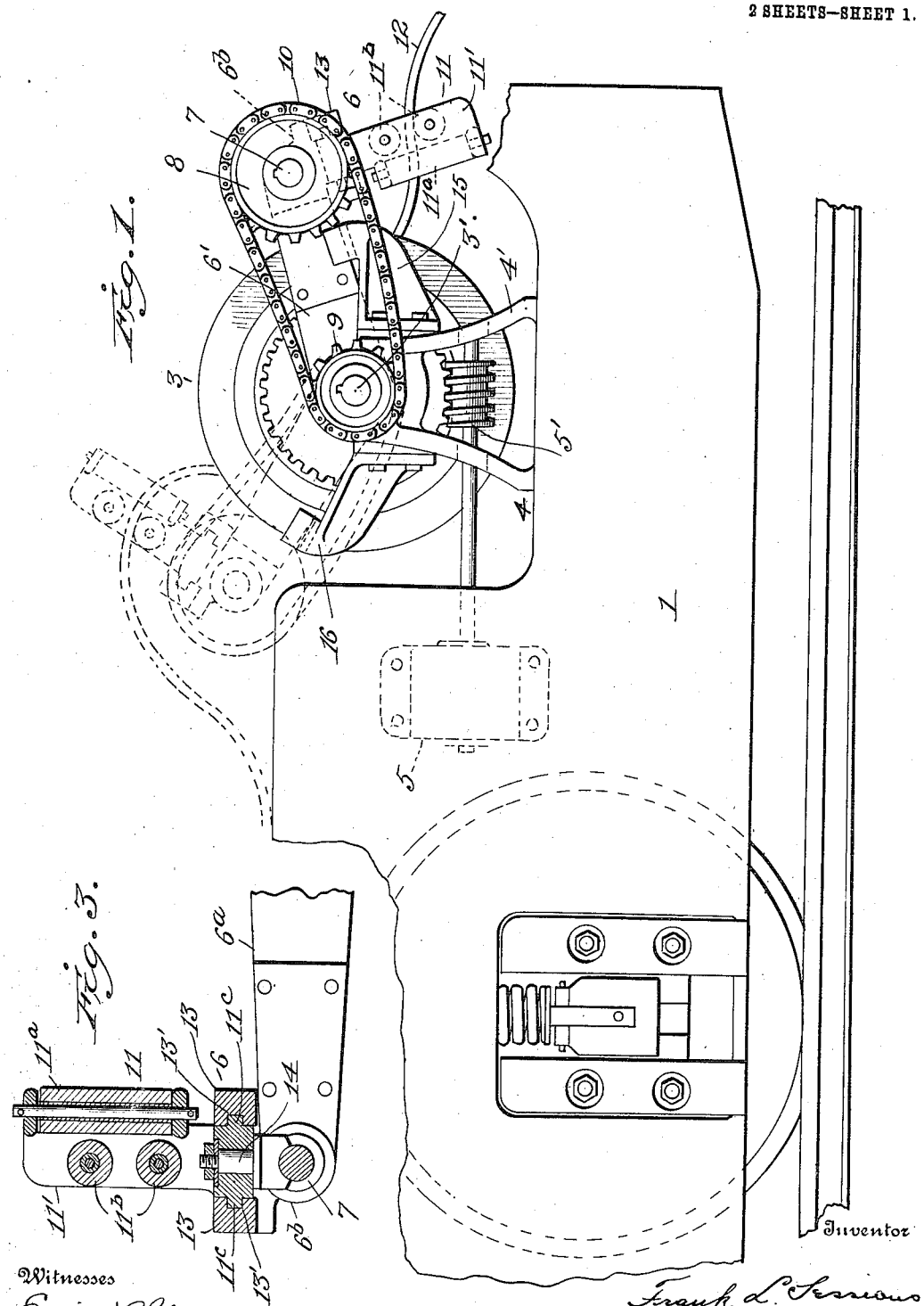

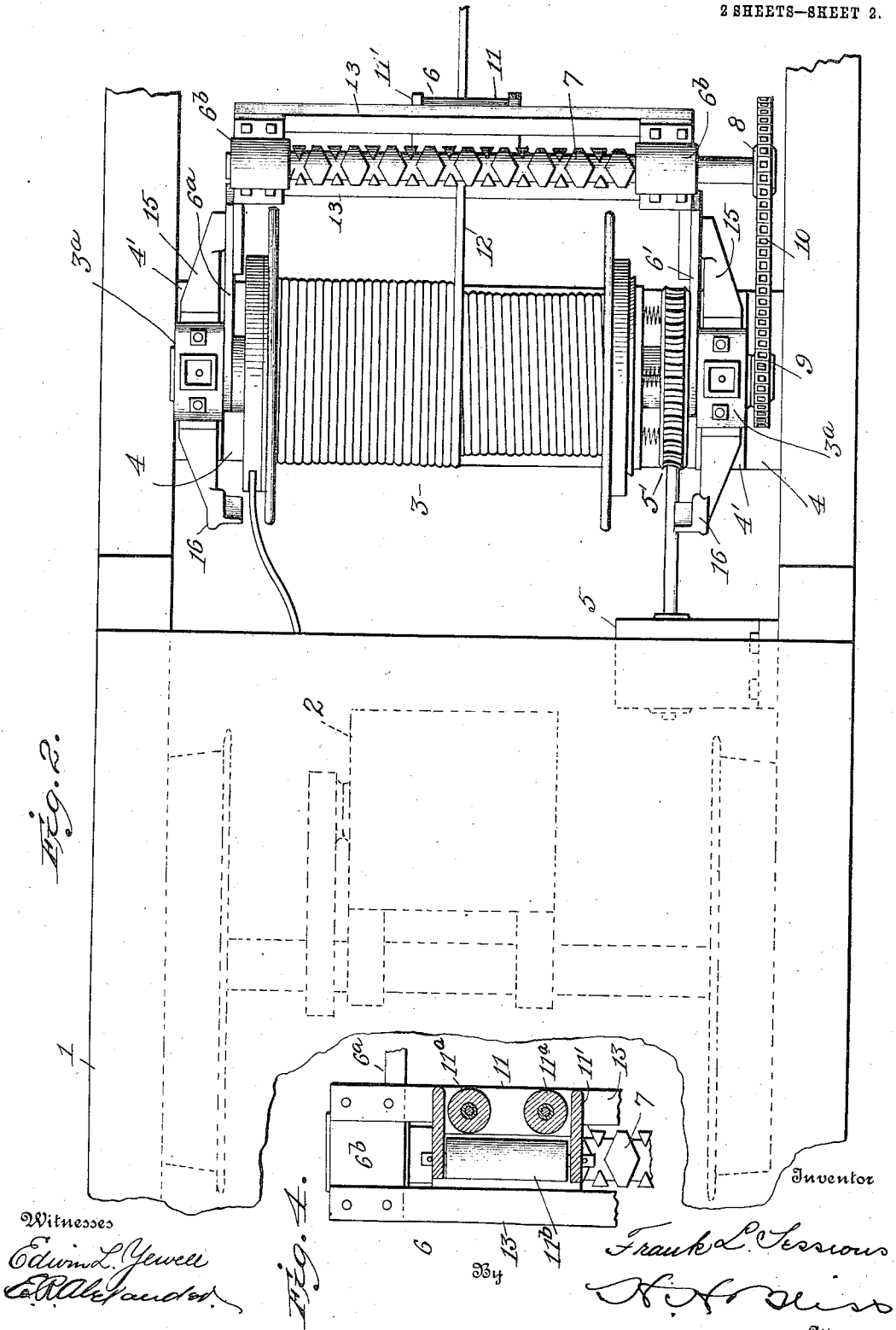

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

CABLE-REELING MECHANISM FOR ELECTRIC LOCOMOTIVES.

959,621. Specification of Letters Patent. Patented May 31, 1910.

Application filed December 18, 1905, Serial No. 292,345. Renewed August 11, 1908. Serial No. 448,003.

*To all whom it may concern:*

Be it known that I, FRANK L. SESSIONS, a citizen of the United States, residing at Columbus, in the county of Franklin and State of Ohio, have invented certain new and useful Improvements in Cable-Reeling Mechanism for Electric Locomotives, of which the following is a specification, reference being had therein to the accompanying drawing.

This invention relates to improved mechanism for spooling and guiding a flexible cable onto a cable reel on an electric locomotive. It is principally adapted for use in connection with horizontally mounted cable reels and is adapted to direct the cable onto the reel from either side thereof in accordance with which end of the locomotive the cable has been paid off from.

For the purposes of illustration I have shown my mechanism applied to a cable reel on an electric locomotive of the type now generally used in mine work.

Figure 1 is a side elevation of a locomotive provided with a cable spooling and guiding mechanism embodying my improvements. Fig. 2 is a plan view of the same. Figs. 3 to 4 show details.

In the drawings 1 indicates as an entirety an electric locomotive, 2 an electric motor for propelling the locomotive, and 3 indicates a cable reel mounted horizontally at one end of the locomotive. This reel is preferably carried by a reel shaft 3' which is mounted at either end in bearings $3^a$, $3^a$ in standards 4', 4' on a reel carrying frame 4 which is secured to the locomotive frame.

The power for operating the reel may be applied thereto in any suitable and well known manner. A separate motor than the one used for propelling the locomotive may be used, or a train of power transmitting devices may be interposed between a locomotive motor and the reel in any desired manner. As this invention does not relate to the manner of and means for driving the reel, I have simply for illustration purposes shown an electric motor 5 secured to the locomotive frame, adapted only for driving the reel and connected thereto by power transmitting devices indicated as an entirety by 5'. The electrical connections to this motor and the propelling motor on the car are not shown, as it is understood that my invention relates only to the cable spooling and guiding mechanism now to be described and that consequently any well known and suitable reeling mechanism and means for operating and controlling the reeling mechanism may be employed.

The mechanism for spooling and guiding the cable onto the reel is indicated as an entirety by 6. Of this mechanism 6' $6^a$ indicate arms loosely mounted on the reel shaft, each one preferably being adjacent to one of the standards 4'. At their outer ends each of these arms carries a bearing block or plate $6^b$. 7 is a double threaded shaft arranged parallel to the reel shaft and mounted at either end in bearings in the adjacent bearing blocks $6^b$. This double threaded shaft extends through one of the bearing blocks $6^b$ at one end of the reel and has secured to it a sprocket wheel 8. 9 is a sprocket wheel arranged in alinement with the sprocket wheel 8 and rigidly secured to the reel shaft. 10 is a driving chain connecting the sprockets 8 and 9. 11 indicates as an entirety a traveler adapted to travel to and fro along said double threaded shaft as it is rotated by the reel shaft. This traveler comprises a frame 11' arranged to carry within it a pair of longitudinally mounted rollers $11^a$ and a pair of transversely mounted rollers $11^b$. The rollers of each of these pairs of rollers are adapted to receive between them and to guide the cable 12. At one end and on opposite sides this cable guide frame has transversely extending ribs $11^c$ which are adapted to engage with the walls of grooves 13' in traveler guides 13, which are arranged at either side of the traveler and have their ends carried by and secured to the bearing blocks $6^b$. 14 is a follower stud pivotally mounted in the cable guide frame 11' and having a projection adapted to engage the walls of the threads on the double threaded shaft and to direct the traveler frame to and fro along said shaft in the well known manner.

When the cable is to be paid off from and wound up on the reel from the end of the locomotive on which the reel is located, it is desirable to have the cable spooling and guiding mechanism arranged as shown in full lines in Fig. 1 so that the traveler 11 for guiding the cable onto the reel will be in front of the reel as it moves toward the paid out cable. To hold the cable spooling and guiding mechanism in this position I have provided brackets 15 arranged at either end of the reel supporting structure, each secured to an adjacent standard 4' and each adapted to be engaged by and to support one of the bearing plates 6ᵇ.

When it is necessary to pay out and reel up the cable from the operator's end of the locomotive, the cable spooling and guiding mechanism may be swung to the position indicated in dotted lines in Fig. 1, in which case the cable guiding traveler is still in front of the reel when the direction of travel of the reel is considered. For maintaining the spooling and guiding mechanism in this position I have provided brackets 16, each arranged at one end of the reel supporting frame, each secured to the adjacent standard 4' and each adapted to be engaged by and support one of the bearing plates 6ᵇ.

The transversely arranged guiding and supporting rollers carried by the traveler frame 11' are so arranged that one of them will support the flexible cable when the spooling and guiding mechanism is in one position of adjustment, while the other will support the cable when the said mechanism is in its other position.

I believe that I am the first to devise a cable spooling and guiding mechanism for a cable reel on an electric locomotive which mechanism is capable of adjustment into various positions relative to the reel in order to facilitate the reeling and spooling of the cable on the reel irrespective of which side of the reel is in advance as the reel moves toward the paid out cable. Very often it is desirable to pay off the cable from the operator's end of the locomotive rather than from the reel end thereof, and consequently the importance of my invention will at once manifest itself, since under such circumstances it is essential to the proper guiding and spooling of the cable that it be directed onto the reel from a point other than that necessary to properly guide it and spool it when the cable is paid off from the reel end of the locomotive.

I have shown in this application an arrangement of reel driving mechanism and friction clutch mechanism and brake device which I have claimed in my application Ser. No. 194,590, Renewal No. 479,515.

I am not the inventor of the independent electric drive for the cable reel or of the worm gearing in the power transmitting devices for operating the reels which are shown and described in this application, and I understand that application, Ser. No. 289,640 upon these features of construction has been filed in the United States Patent Office by N. A. Newdick.

What I claim is:—

1. In a cable reeling mechanism for an electric locomotive, the combination with the locomotive truck, and a cable reel arranged to travel therewith and adapted to have a flexible cable wound upon and paid off from it, of a cable spooling and guiding device for directing the cable onto the reel, comprising a double threaded shaft, a follower adapted to travel along said shaft, supporting arms for said shaft pivoted about the axis of said reel, means for rotating said shaft, and brackets for engaging said supporting arms and holding said double threaded shaft and follower at different points about the periphery of said reel.

2. In a cable reeling mechanism for an electric locomotive, the combination with a cable reel mounted on a transverse horizontal axis and means for operating it, of a cable spooling and guiding mechanism mounted to swing about the axis of the reel and to be supported in a position in front of the reel or in a position behind the reel and comprising a double threaded shaft parallel to the reeling axis, and a follower adapted to travel along said shaft, and power transmitting gearing positively connecting the reel and the said shaft irrespective of the position of adjustment of the cable spooling and guiding mechanism.

3. In a cable reeling mechanism for an electric locomotive, the combination with a cable reel mounted on a transverse horizontal axis and means for operating it, of a cable spooling and guiding mechanism mounted on a frame adapted to swing about the axis of the reel, means for supporting the frame in a position in front of the reel, means for supporting the frame in a position behind the reel, the cable spooling and guiding mechanism comprising a threaded shaft parallel to the reeling axis, and a follower adapted to travel along said shaft, and power transmitting gearing positively connecting the reel and the said shaft irrespective of the position of adjustment of the cable spooling and guiding mechanism and mounted upon the said swinging frame.

4. In a cable reeling mechanism for an electric locomotive, the combination with a horizontal reel shaft, a cable reel mounted thereon and means for operating it, of a frame mounted to swing about the axis of the reel, a cable spooling and guiding mechanism mounted on the frame, means for supporting the frame in a position in front of the reel or in a position behind the reel, the cable spooling and guiding mechanism comprising a threaded shaft parallel to the reel axis, and a follower adapted to travel along said shaft, and power transmitting gearing positively connecting the reel and the shaft, irrespective of the position of adjustment of the cable spooling and guiding mechanism, the apparatus being arranged to automatically reverse the direction of movement of the follower at each end of its travel, irrespective of the direction of movement of the cable.

5. In a cable reeling mechanism, for an electric locomotive, the combination of a horizontal transverse reel shaft, with a cable reel mounted thereon, means for operating the reel, the frame mounted to swing about the axis of the reel shaft, a cable spooling and guiding mechanism mounted to swing about the axis of the reel, means for supporting the frame in a position in front of the reel, means for supporting the frame in a position behind the reel, the cable spooling and guiding mechanism comprising a threaded shaft parallel to the reel shaft, and a follower adapted to travel along the shaft, a sprocket wheel fixed upon the shaft, a sprocket wheel mounted concentric with and rigidly connected to the reel, and a sprocket chain connecting the two sprocket wheels.

In testimony whereof I affix my signature, in presence of two witnesses.

FRANK L. SESSIONS.

Witnesses:
F. E. VAN SLYKE,
E. P. SNIVELY.